United States Patent
Jun

(10) Patent No.: US 7,454,560 B2
(45) Date of Patent: Nov. 18, 2008

(54) METHOD AND APPARATUS TO PERFORM IMPROVED RETRY IN DATA STORAGE SYSTEM

(75) Inventor: Jin-wan Jun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 411 days.

(21) Appl. No.: 10/956,343

(22) Filed: Oct. 4, 2004

(65) Prior Publication Data

US 2005/0144376 A1 Jun. 30, 2005

(30) Foreign Application Priority Data

Oct. 4, 2003 (KR) ............... 10-2003-0068992

(51) Int. Cl.
*G06F 12/16* (2006.01)

(52) U.S. Cl. ..................................... 711/112
(58) Field of Classification Search ................. 711/112
See application file for complete search history.

(56) References Cited

U.S. PATENT DOCUMENTS

| 6,122,235 | A * | 9/2000 | Arai ..................... 369/53.35 |
| 6,175,456 | B1 * | 1/2001 | Yun ........................ 360/46 |
| 6,384,999 | B1 | 5/2002 | Schibilla |
| 6,687,194 | B1 | 2/2004 | Kobayashi et al. |
| 7,050,252 | B1 * | 5/2006 | Vallis ....................... 360/53 |
| 2003/0048731 | A1 * | 3/2003 | Ozaki ..................... 369/59.25 |
| 2005/0052770 | A1 * | 3/2005 | Osafune .................... 360/51 |

FOREIGN PATENT DOCUMENTS

| CN | 1479274 A | | 3/2004 |
| JP | 10-255403 | | 9/1998 |
| JP | 11-66763 | | 3/1999 |
| JP | 11-066763 | | 3/1999 |
| JP | 2000-67530 | | 3/2000 |
| JP | 2000 182292 A | | 6/2000 |
| JP | WO 02/09107 | * | 7/2000 |
| JP | 2001-110004 | | 4/2001 |
| JP | 2003-257130 | | 9/2003 |

OTHER PUBLICATIONS

European Search Report Dated Mar. 30, 2006.
Japanese Patent Office Official Action Dated Apr. 4, 2006.

* cited by examiner

*Primary Examiner*—Hyung Sough
*Assistant Examiner*—Shawn Eland
(74) *Attorney, Agent, or Firm*—Staas & Halsey LLP

(57) ABSTRACT

A method of performing a retry in a data storage system, and an apparatus using the same, includes storing information regarding retry parameters corresponding to a position on a storage medium in response to successfully reading data from the position using the retry parameters, reading the data from the position in a subsequent read operation according to the stored information, and rewriting the data at the position.

33 Claims, 4 Drawing Sheets

PRIOR ART    FIG. 1

METHOD AND APPARATUS TO PERFORM IMPROVED RETRY IN DATA STORAGE SYSTEM

CROSS-REFERENCE TO RELATED APPLICATIONS

This application claims the benefit of Korean Patent Application No. 2003-68992, filed Oct. 4, 2003, in the Korean Intellectual Property Office, the disclosure of which is incorporated herein by reference.

BACKGROUND OF THE INVENTION

1. Field of the Invention

The present invention relates to a data storage system and method of controlling the same, and, more particularly, to a method and apparatus to perform improved retry in a data storage system, which reduces a number of read retry attempts by making use of information regarding a previous successful retry.

2. Description of the Related Art

Related techniques are disclosed in Japanese Patent Publication Nos. 1999-066763 and 2000-067530.

Japanese Patent Publication No. 1999-66763 teaches a method in which information about a read retry position and corresponding read retry parameters are stored, and, after that, if a read retry should be attempted at the same position, the retry parameters are used to read data from the position. Japanese Patent Publication No. 2000-67530 teaches a method in which parameters of performed retries are sequentially stored with new parameters put on top, so that a fast retry can be achieved.

Generally, a hard disc drive is a type of data storage system that contributes to a system operation by reproducing data from a disc, or writing user data on the disc, using a magnetic head. Recently, in hard disc drives, there has been a trend toward high capacity, high density, and miniaturization. In particular, there has been a trend toward a high recording bit density in a rotating direction (bits per inch, BPI) and in a radial direction (tracks per inch, TPI). Thus, a more sophisticated mechanism to control the hard disc drive is needed.

As the mechanism or hardware feature to be applied to the hard disc drive is changed, errors may occur frequently while in the process of data reading. If errors occur in a reading/writing operation, a (read/write) retry process should be executed to successfully perform the reading/writing operation.

More specifically, when an error occurs during a reading operation, a read retry process is performed by varying values of parameters related to an off-track read or data read, and the retry process is repeated until it is successful or until a maximum number of retries is reached.

Generally, errors in reading tend to reoccur at the same location, and thus the probability of performing a retry process at such a location is high, which deteriorates the read function of a hard disc drive.

SUMMARY OF THE INVENTION

The present invention provides a method and apparatus to perform an improved retry in a data storage system, which reduce the probability of having to repeatedly perform a retry at a given position by applying retry parameters with which data was successfully read from the position before, in order to successfully read data from the position again, and then rewriting the data at the position.

Additional aspects and/or advantages of the invention will be set forth in part in the description which follows and, in part, will be obvious from the description, or may be learned by practice of the invention.

According to an aspect of the present invention, there is provided a method of performing an improved retry in a data storage system, the method comprising: determining whether an attempt to read data from a storage medium is successful in a read retry process; storing information regarding retry parameters and a position on the storage medium where the attempt was successful with the retry parameters, in response to the data being successfully read from the storage medium; searching for the stored information regarding the retry parameters and the position in response to the data storage system being in a predetermined state; and seeking the position, reading the data from the position using the retry parameters, and then rewriting the data at the position according to the stored information.

According to an aspect of the present invention, the predetermined state of the data storage system may comprise an idle state.

According to an aspect of the present invention, the predetermined state of the data storage system may comprise a power-on state.

According to an aspect of the present invention, the information about the position may comprise a cylinder, head, and a sector (C/H/S) where the attempt to read data was successful in the retry process.

According to an aspect of the present invention, the seeking the position, reading the data from the position using the retry parameters, and then rewriting the data on the position according to the searched for information may comprise using predefined retry parameters, and then rewriting the data at the position in response to the retry process successfully reading the data from the position, in response to the reading of the data from the position using the retry parameters according to the stored information being unsuccessful.

According to an aspect of the present invention, the predefined retry parameters may be adjusted from the retry parameters with which a previous attempt to read the data was successful.

According to an aspect of the present invention, the information about the retry parameters and the position may be stored in a maintenance cylinder of the storage medium.

According to an aspect of the present invention, the information about the retry parameters and the position may be stored in a non-volatile memory.

According to an aspect of the present invention, the method may further comprise deleting the stored information regarding the retry parameters with which the retry was successful and which have been applied to rewrite the data at the position, in response to completion of the rewriting of the data.

According to another aspect of the present invention, there is an apparatus to perform a retry in a data storage system, the apparatus comprising: a host interface to communicate with a host device; a memory to store programs to control the data storage system and data; a buffer to store the data, wherein the data is received from the host device via the host interface or reproduced from a recording medium in a read mode; a controller to store information regarding retry parameters and a position on the recording medium where a read retry is successful with the retry parameters, and to read out data from the position by using the retry parameters in response to the data storage system being changed to a predetermined state, and to then rewrite the data at the position; and a circuit to process the data by writing the data from the buffer onto the recording medium or reading the data from the recording medium to be stored in the buffer.

According to an aspect of the present invention, the information regarding the retry parameters and the position may be stored in a maintenance cylinder of the recording medium.

According to an aspect of the present invention, the information regarding the retry parameters and the position may be stored in the memory.

According to an aspect of the present invention, the predetermined state of the data storage system may comprise an idle state.

According to an aspect of the present invention, the predetermined state of the data storage system may comprise a power-on state.

According to an aspect of the present invention, the controller may execute the retry process using predefined retry parameters in response to an unsuccessful attempt to read the data with the retry parameters in the stored information, and then rewrite the data at the position where the data reading is successful in response to the data reading being successful.

According to an aspect of the present invention, the predefined retry parameters may be adjusted from the retry parameters with which a previous data reading was successful.

According to an aspect of the present invention, the controller may delete the stored information regarding the retry parameters that are applied to rewrite the data at the position in response to completion of the rewriting of the data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
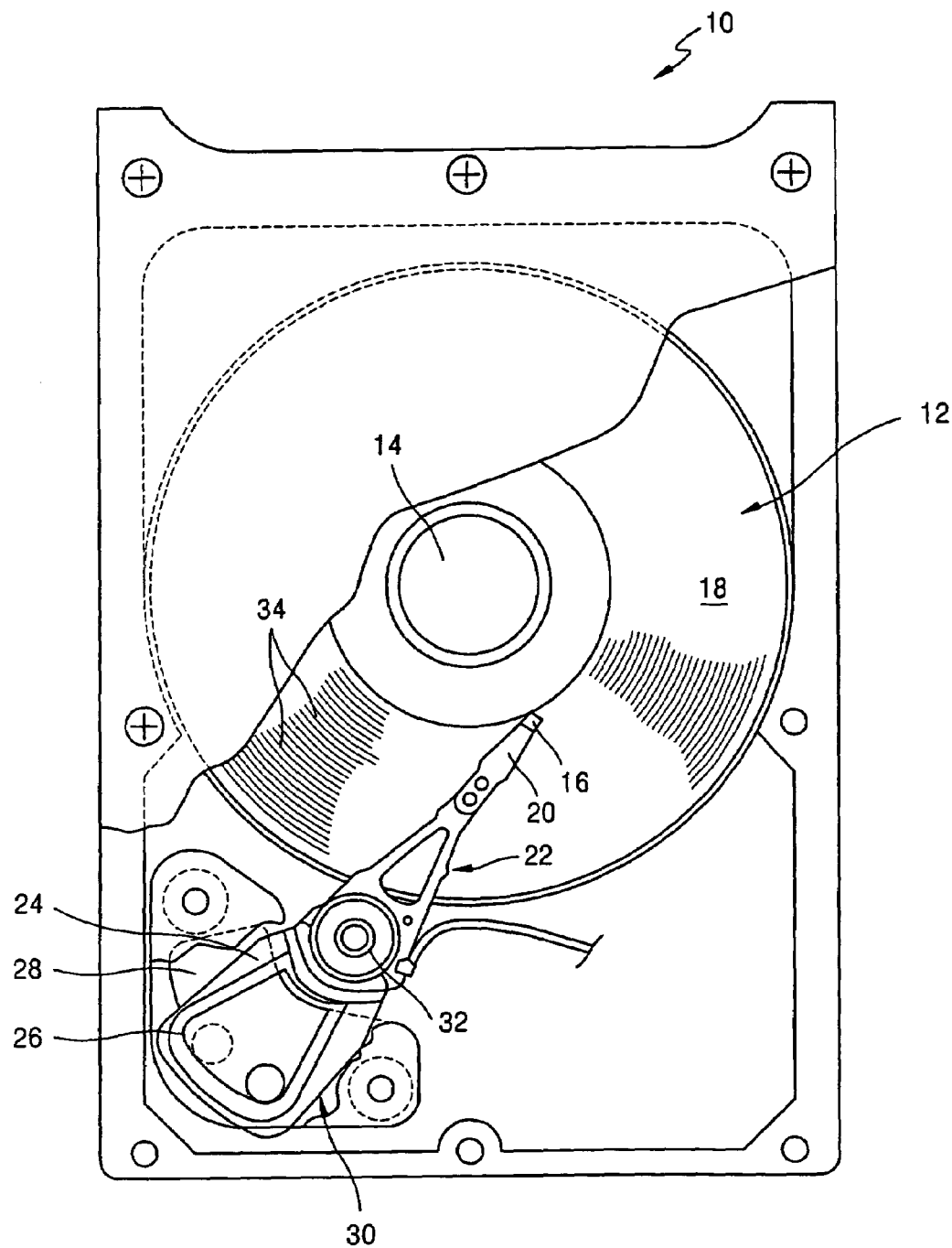
FIG. 1 is a plane view of a disc drive to which an embodiment of the present invention is applied.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a plane view of a disc drive 10 to which an embodiment of the present invention is applied. In FIG. 1, the disc drive 10 includes at least one magnetic disc 12 rotated by a spindle motor 14. The disc drive 10 also includes a transducer 16 positioned close to a disc surface 18.

The transducer 16 reads data from the disc 12 by sensing a magnetic field of the disc 12, and writes data on the disc 12 by magnetizing the disc 12. Typically, the transducer 16 is coupled with the disc surface 18. Although, the transducer 16 is described as being a single transducer, it should be understood that the transducer 16 actually includes a writing transducer to magnetize the disc 12, and a separate reading transducer to sense the magnetic field of the disc 12. The separate reading transducer comprises of magneto-resistive (MR) elements. The transducer 16 is usually referred to as a head.

The transducer 16 may be integrated into a slider 20. The slider 20 is structured to generate an air bearing between the transducer 16 and the disc surface 18. Further, the slider 20 is combined into a head gimbal assembly 22. The head gimbal assembly 22 is mounted on an actuator arm 24 driven by a voice coil motor 30. A voice coil 26 is located adjacent to a magnet assembly 28 to define the voice coil motor 30. Providing a current to the voice coil 26 generates a torque that makes the actuator arm 24 rotate around a bearing assembly 32. The rotation of the actuator arm 24 moves the transducer 16 across the disc surface 18.

Generally, information is stored on annular tracks 34 of the disc 12. Each track 34 contains a plurality of sectors. Each sector includes a data field and an identification field. The identification field is comprised of Gray codes that identify sectors and tracks 34 (also known as cylinders). The transducer 16 moves across the disc surface 18 to read/write information on the tracks 34.

Figure 2:
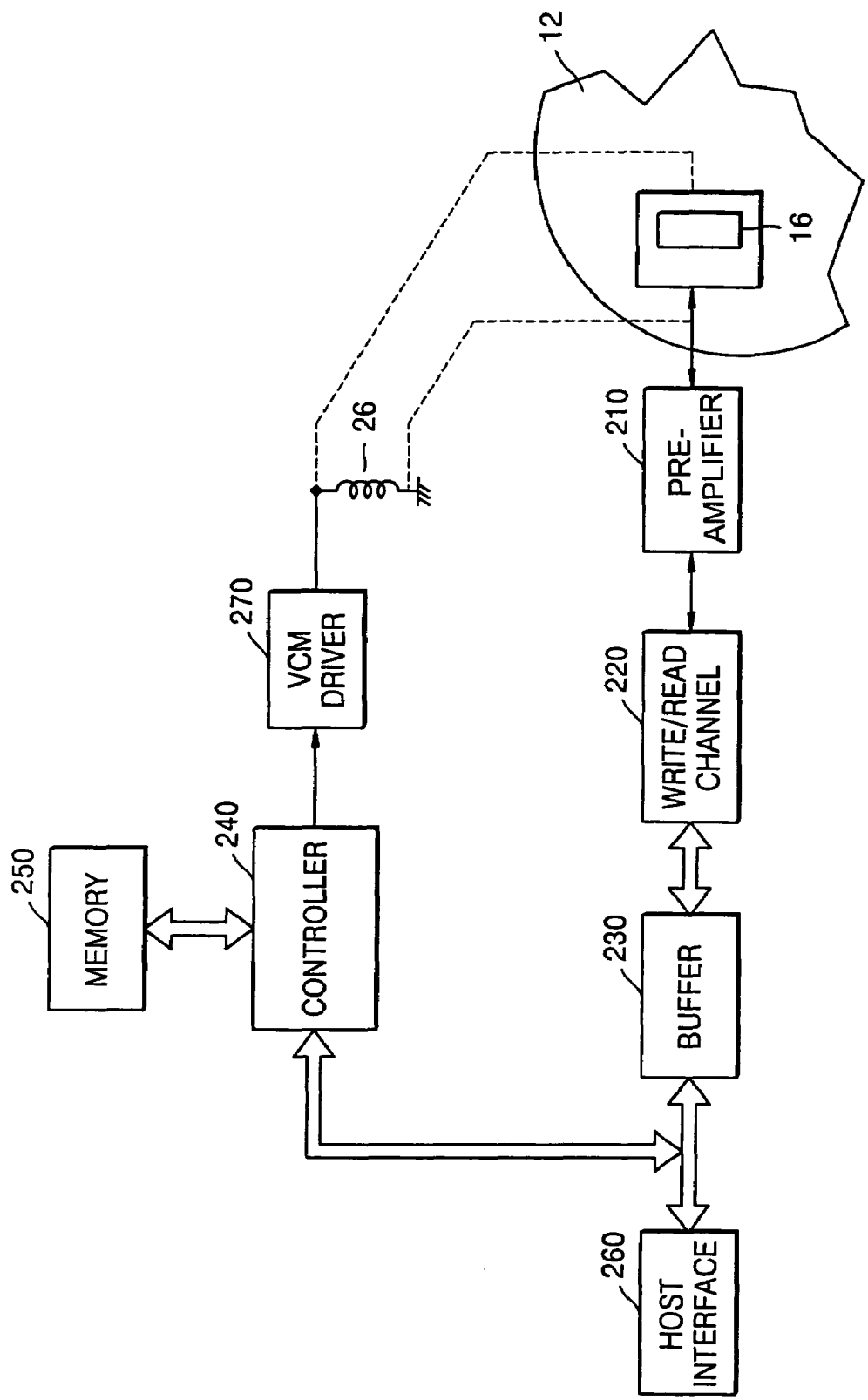
FIG. 2 is an electrical circuit diagram of a disc drive according to an embodiment of the present invention.

FIG. 2 is an electrical circuit diagram of a disc drive according to an embodiment of the present invention.

In FIG. 2, the disc drive includes the disc 12, the transducer 16, a pre-amplifier 210, a write/read channel 220, a buffer 230, a controller 240, a memory 250, a host interface 260, and a voice coil motor (VCM) driver 270.

The pre-amplifier 210 and the write/read channel 220 together may be referred to as a write/read circuit.

Figure 3:
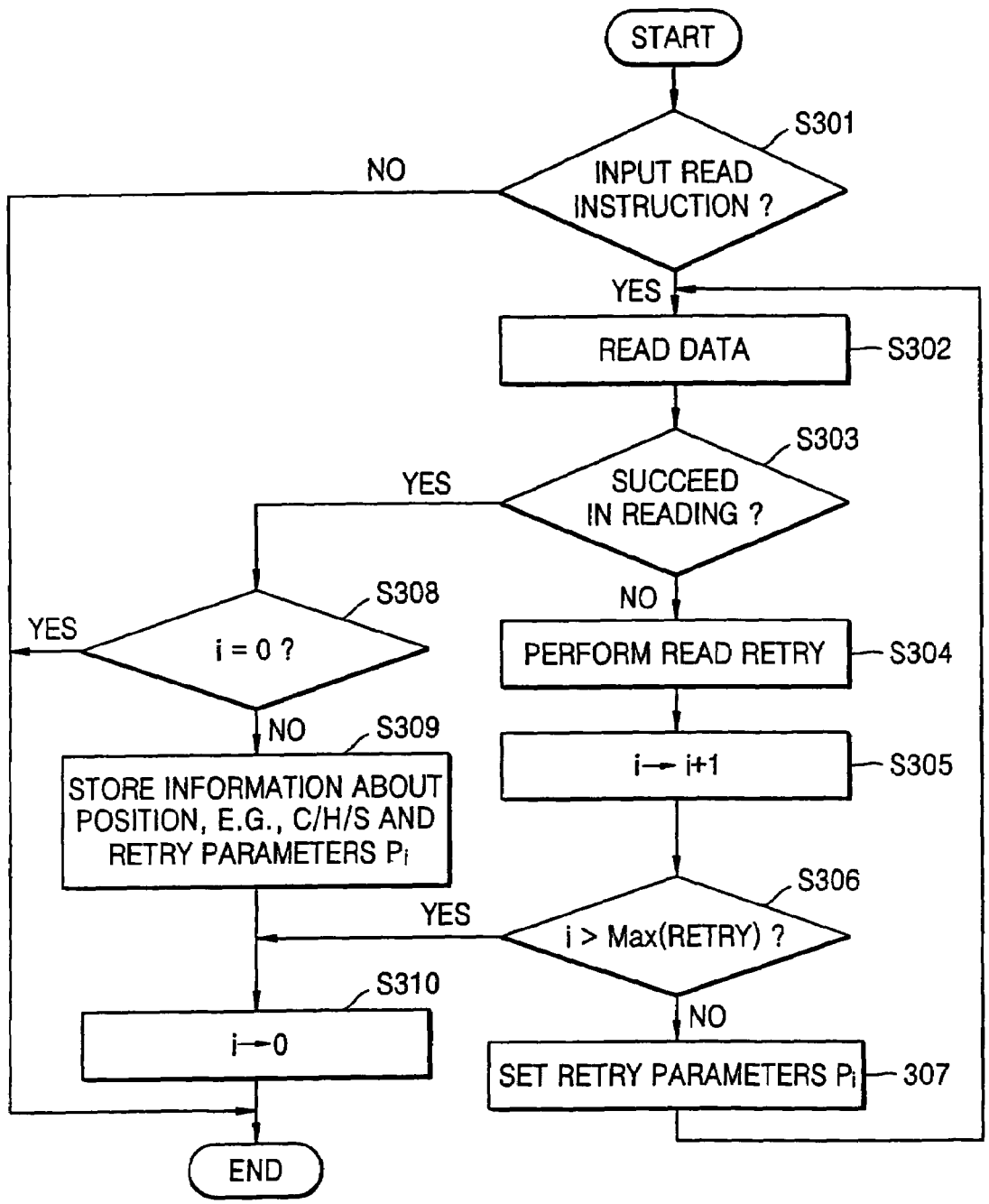
FIG. 3 is a flowchart that illustrates a method of storing information regarding a previous successful reading/writing retry, according to an embodiment of the present invention.
Figure 4:
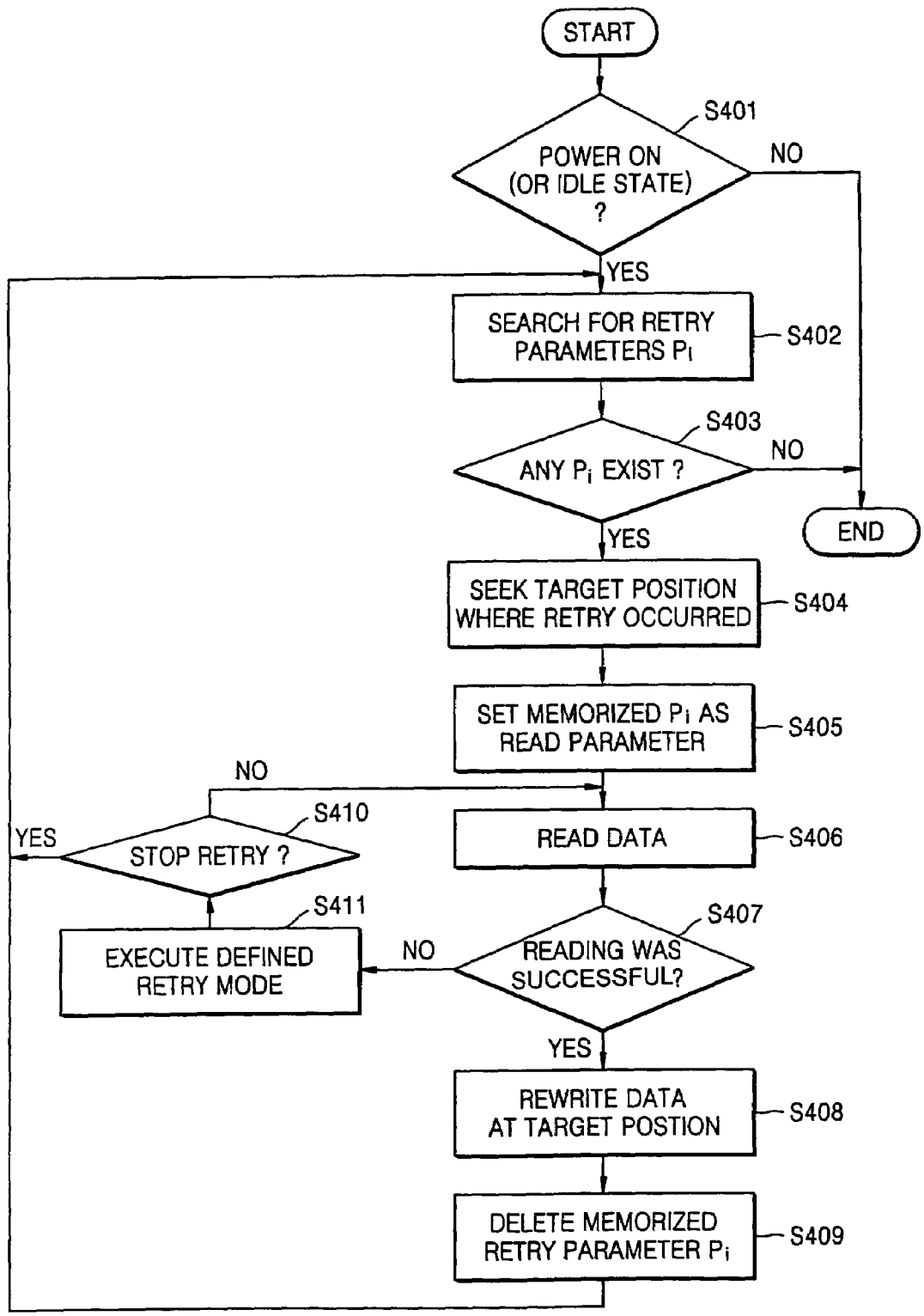
FIG. 4 is a flowchart that illustrates a method of performing an improved retry in a data storage system using information regarding a previous successful retry, according to an embodiment of the present invention.

The memory 250 stores various programs to control the disc drive and data, and, in particular, stores a program to execute operations of the flowcharts of FIGS. 3 and 4. The memory 250 may be a non-volatile memory.

Operation of a disc drive according to an embodiment of the present invention will now be described with reference to FIG. 2.

In a data read mode of the disc drive, the pre-amplifier 210 amplifies an electrical signal detected by the transducer 16 from the disc 12. Then, the write/read channel 220 encodes the amplified analog signal into a corresponding digital signal for a host device (not shown) to be able to read, and further converts the encoded signal into stream data. The buffer 230 stores the stream data temporarily and forwards it to the host interface 260. The host interface 260 transmits the stream data to the host device.

Meanwhile, in a data write mode of the disc drive, the host interface 260 receives data from the host device. The buffer 230 temporarily stores and sequentially outputs the data. The write/read channel 220 converts data output by the buffer 230 into binary data streams to be written on the disc. The binary data streams are amplified by the pre-amplifier 210 and then are written on the disc 12 by the transducer 16.

The controller 240 controls the overall operation of the disc drive. Particularly, in the read mode, the controller 240 controls the disc drive to memorize information regarding retry parameters and a corresponding position where a read retry was successful with the retry parameters. If a control condition of the disc drive is changed into an idle state or a power-on state, the controller 240 controls the disc drive to read data from a position using retry parameters with which a previous read retry was successful at that same position, and then to rewrite the data at the same position. The information regarding the retry parameters and the corresponding position may be stored in a maintenance cylinder of the disc 12, or in the memory 250.

If data reading fails with the memorized retry parameters, the controller 240 controls the disc drive to perform the retry process using defined retry parameters. And, if the read retry is successful with the defined retry parameters, the controller 240 controls the disc drive to re-write the data resulting from the read retry at the corresponding position of the disc. The defined retry parameters are slightly different from the memorized retry parameters.

After the rewriting, the controller 240 deletes the memorized retry parameters for the corresponding position from the disc 12 or the memory 250.

A method of performing an improved retry in a data storage system according to an embodiment of the present invention will now be described with reference to FIGS. 3 and 4.

FIG. 3 is a flowchart illustrating a process of storing information regarding a previous successful retry, and FIG. 4 is a flowchart illustrating a process of performing rewriting according to the information regarding the retry stored in the process of FIG. 3.

Referring to FIG. 3, the controller 240 determines whether an instruction to read data from the disc 12 is input from the host device via the host interface 260 in operation S301.

If it is determined that the instruction to read data is input in operation S301, the controller 240 controls the disc drive to seek a target position, such as a target cylinder and sector of the disc 12, and read data from the target position, in operation S302.

In operation S303, the controller 240 determines whether an error is detected while reading data.

If an error is detected in operation S303, the controller 240 performs a read retry mode in operation S304.

In the retry mode, in operation S305, the controller 240 increments a count value i, which indicates the number of retries that have been performed, whenever the retry mode is initiated.

Subsequently, in operation S306, the controller 240 compares the count value i with a predetermined maximum retry number Max(retry).

If it is determined in operation S306 that the count value i is not greater than the maximum retry number Max(retry), then, in operation S307, the controller 240 sets retry parameters $P_i$ corresponding to the retry number i, and then goes back and performs operation S302 again, to read data from the position using the retry parameters $P_i$.

If no error is detected in operation S303, which means that the data reading was successful, the controller 240 checks whether the count value is 0 so as to determine whether the successful data reading was achieved in the retry process, in operation S308. Here, a non-zero count value means that the successful data reading was achieved in a retry process.

If the count value i is determined to be '0' in operation S308, the data reading is finished. Meanwhile, if the count value i is determined to be non-zero in operation S308, information about a position, e.g., a cylinder/head/sector (C/H/S) where the retry process was applied, and information about the retry parameters $P_i$ that enabled the successful data reading, are stored in the maintenance cylinder of the disc 12 or in the memory 250 by the controller 240, in operation S309.

After operation S309, the controller 240 resets the counter value to '0' in operation S310.

According to this method, the information about the position and the retry parameters is stored on the disc 12 or in the memory 250.

Next, a method of performing an improved retry to reduce a possible retry number using information regarding a previous successful retry will now be described with reference to FIG. 4.

First, the controller 240 of the disc drive determines whether the disc drive has been changed into the power-on state or the idle state, in operation S401.

If it is determined in operation S401 that the disc drive has been changed into the power-on state or the idle state, the controller 240 searches for retry parameters $P_i$, with which data reading was previously conducted successfully, on the disc 12 or in the memory 250 in operation S402.

In operation S403, it is determined whether previously successful retry parameters $P_i$ are found saved on the disc 12 or in the memory 250. If no retry parameters $P_i$ are found on the disc 12 or in the memory 250, the controller 240 terminates execution of this method.

If previously successful retry parameters $P_i$ are found on the disc 12 or in the memory 250, the controller 240 sequentially reads out the information regarding the previous successful retry, and, according to the information, seeks a target position to read data, in operation S404.

Then, the controller 240 sets the retry parameters according to the information regarding previously successful read-related parameters in operation S405, and attempts to read the data in operation S406.

Next, in operation S407, the controller determines whether an error occurs while reading data. If an error is detected, the controller 240 performs a defined retry mode in operation S411. The defined retry mode is a retry mode using predefined retry parameters that are slightly different from the retry parameters that enabled successful data reading before.

Subsequently, in operation S410, the controller 240 determines whether the defined retry mode has ended. If the defined retry mode has ended, the controller 240 returns to perform operation S402, and if the defined retry mode has not ended, the controller 240 goes back to perform operation S406.

If no error occurs in the reading of data in operation S407, the controller 240 rewrites data at the target position of the C/H/S in operation S408. Sequentially, the controller 240 deletes the information regarding the successful retry, e.g., information on the position and the retry parameters that enabled a successful retry at the position, from the disc 12 or the memory 250.

As described above, according to the present invention, the probability of repeating a retry at a position of a disc may be lowered by reading data from the position using retry parameters with which a previous read retry was successfully executed, and then rewriting the data at the position, so that the performance of the disc drive can be enhanced.

It is understood that an embodiment of the present invention may be used and/or controlled by a machine-readable medium on which is stored a set of instructions (i.e., software) embodying any one, or all, of the embodiments described herein. The machine-readable medium may include permanent or removable storage, such as magnetic and optical discs, RAM, ROM, a carrier wave medium, etc., on which the process and data structures of the present invention can be stored and distributed. The operations can also be distributed via, for example, downloading over a network such as the Internet.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of performing a retry in a data storage system, the method comprising:
   determining whether an attempt to read data from a storage medium is successful in a read retry process;
   storing information regarding successful retry parameters and a position on the storage medium where the read retry attempt was successful with the successful retry parameters indicating that the data was successfully read from the storage medium; and
   in response to the data storage system being in a predetermined state, after the storing of the information, searching within the stored information for identifiers indicating at least one successful read retry of data of the storage medium, reading the stored information based upon at least one found identifier identifying corresponding successful retry parameters and position, seeking the corresponding position, rereading data from the corresponding position using the corresponding successful retry parameters read from the stored information, and then rewriting the reread data at the corresponding position according to the stored information if it is determined that the rereading of data from the corresponding position was successful.

2. The method of claim 1, wherein the predetermined state of the data storage system comprises an idle state.

3. The method of claim 1, wherein the predetermined state of the data storage system comprises a power-on state.

4. The method of claim 1, wherein the stored information about the corresponding position comprises a cylinder, head, and a sector (C/H/S) where a read retry attempt to read data was successful.

5. The method of claim 1, wherein the corresponding successful retry parameters and position are stored in a maintenance cylinder of the storage medium.

6. The method of claim 1, wherein the corresponding retry parameters and position are stored in a non-volatile memory.

7. The method of claim 1, further comprising:
   deleting the at least one found identifier in the stored information regarding the corresponding successful retry parameters that are applied during the rewriting of the reread data at the corresponding position, in response to completion of the rewriting of the reread data.

8. The method of claim 1, wherein the rereading of data from the corresponding position using the corresponding successful retry parameters is repeated a predetermined number of times in response to unsuccessful results of the rereading of data from the corresponding position.

9. The method of claim 8, wherein the repeating of the rereading of data the predetermined number of times comprises adjusting the corresponding successful retry parameters during each attempt.

10. The method of claim 9, wherein the adjusting of the corresponding successful retry parameters during each attempt comprises adjusting the corresponding successful retry parameters according to the number of times attempted.

11. A method of performing a retry in a data storage system, the method comprising:
    determining whether an attempt to read data from a storage medium is successful in a read retry process;
    storing information regarding successful retry parameters and a position on the storage medium where the read retry attempt was successful with the successful retry parameters indicating that the data was successfully read from the storage medium;
    searching within the stored information for identifiers indicating at least one successful read retry of data of the storage medium, reading the stored information based upon at least one found identifier identifying corresponding successful retry parameters and position, in response to the data storage system being in a predetermined state and after the storing of the information; and
    seeking the corresponding position, rereading data from the corresponding position using the corresponding successful retry parameters read from the stored information, and then rewriting the reread data at the corresponding position according to the stored information if it is determined that the rereading of data from the corresponding position was successful,
    wherein the seeking of the corresponding position, rereading of data from the corresponding position using the corresponding successful retry parameters, and then rewriting of the reread data on the corresponding position according to the stored information comprises:
    using predefined retry parameters in response to the rereading of data from the corresponding position using the corresponding successful retry parameters being unsuccessful; and
    rewriting the reread data at the corresponding position in response to a retry process using the predefined retry parameters being successful.

12. The method of claim 11, wherein the predefined retry parameters are adjusted from the corresponding successful retry parameters.

13. The method of claim 11, further comprising:
    deleting the at least one found identifier in the stored information regarding the corresponding successful retry parameters that are applied during the rewriting of the reread data at the corresponding position, in response to completion of the rewriting of the reread data.

14. An apparatus to perform a retry in a data storage system, the apparatus comprising:
    a host interface to communicate with a host device;
    a memory to store programs to control the data storage system and data;
    a buffer to store the data, wherein the data is received from the host device via the host interface or reproduced from a storage medium in a read mode;
    a controller configured to perform the read mode and a read retry mode to read the data from the storage medium, store information regarding successful retry parameters and a position on the storage medium where the read retry is successful with the successful retry parameters, and in response to the data storage system being changed to a predetermined state, after the storing of the information, search within the stored information for identifiers indicating at least one successful read retry of data of the storage medium, read the stored information based upon at least one found identifier identifying corresponding successful retry parameters and position, reread data from the corresponding position by using the corresponding successful retry parameters read from the stored information, and rewrite the reread data at the corresponding position if it is determined that the rereading of data from the corresponding position was successful; and
    a circuit to control a data writing from the buffer onto the storage medium or data reading from the storage medium to be stored in the buffer.

15. The apparatus of claim 14, wherein the corresponding successful retry parameters and position are stored in a maintenance cylinder of the storage medium.

16. The apparatus of claim 14, wherein the corresponding successful retry parameters and position are stored in the memory.

17. The apparatus of claim 14, wherein the predetermined state of the data storage system comprises an idle state.

18. The apparatus of claim 14, wherein the predetermined state of the data storage system comprises a power-on state.

19. The apparatus of claim 14, wherein the controller deletes the at least one found identifier in the stored information regarding the corresponding successful retry parameters that are applied during the rewriting of the reread data at the corresponding position, in response to completion of the rewriting of the reread data.

20. The apparatus of claim 14, wherein the data storage system is a hard drive.

21. An apparatus to perform a retry in a data storage system, the apparatus comprising:
a host interface to communicate with a host device;
a memory to store programs to control the data storage system and data;
a buffer to store the data, wherein the data is received from the host device via the host interface or reproduced from a storage medium in a read mode;
a controller configured to perform the read mode and a read retry mode to read the data from the storage medium, store information regarding successful retry parameters and a position on the storage medium where the read retry is successful with the successful retry parameters, and in response to the data storage system being changed to a predetermined state, after the storing of the information, search within the stored information for identifiers indicating at least one successful read retry of data of the storage medium, read the stored information based upon at least one found identifier identifying corresponding successful retry parameters and position, reread data from the corresponding position by using the corresponding successful retry parameters stored in the information, and rewrite the reread data at the corresponding position if it is determined that the rereading of data from the corresponding position was successful; and
a circuit to control data writing from the buffer onto the storage medium or data reading from the storage medium to be stored in the buffer,
wherein the controller executes another retry process using predefined retry parameters in response to the rereading of data with the corresponding successful retry parameters being unsuccessful, and rewrites data reread at the corresponding position in the other retry process to the corresponding position upon a determination that the other retry process was successful using the predefined retry parameters.

22. The apparatus of claim 21, wherein the predefined retry parameters are adjusted from the corresponding successful retry parameters.

23. The apparatus of claim 21, wherein the controller deletes the at least one found identifier in the stored information regarding the corresponding successful retry parameters that are applied during the rewriting of the reread data at the corresponding position, in response to completion of the rewriting of the reread data.

24. A method of performing a retry in a data storage system, the method comprising:
storing information including an indicator of a successful read retry with successful retry parameters corresponding to a position on a storage medium upon a corresponding successful reading of data from the position using the successful retry parameters;
searching within the stored information for identifiers indicating at least one successful read retry of data of the storage medium;
reading the stored information based upon at least one found identifier identifying corresponding successful retry parameters and position;
rereading data from the corresponding position by using the corresponding successful retry parameters read from the stored information; and
rewriting the reread data at the corresponding position if it is determined that the rereading of data from the corresponding position was successful,
with the corresponding successful retry parameters comprising at least values of parameters related to track alignment of a corresponding reading head with regard to recording tracks on the storage medium.

25. The method of claim 24, wherein the searching within the stored information, reading of the stored information, and rereading of data from the corresponding position occurs in response to the data storage system being in a predetermined state after the storing of the information.

26. The method of claim 24, further comprising:
deleting the at least one found identifier in the stored information regarding the corresponding successful retry parameters that are applied during the rewriting of the reread data at the corresponding position, in response to completion of the rewriting of the reread data.

27. An apparatus to perform a retry in a data storage system, the apparatus comprising:
a controller to store information including an indicator of a successful read retry with successful retry parameters corresponding to a position on a storage medium upon a corresponding successful reading of data from the position using the successful retry parameters,
wherein the controller controls a searching within the stored information for identifiers indicating at least one successful read retry of data of the storage medium, a reading of the stored information based upon at least one found identifier identifying corresponding successful retry parameters and position, a rereading of data from the corresponding position by using the corresponding successful retry parameters read from the stored information, and a rewriting of the reread data at the corresponding position if it is determined that the rereading of data from the corresponding position was successful,
with the corresponding successful retry parameters comprising at least values of parameters related to track alignment of a corresponding reading head with regard to recording tracks on the storage medium.

28. The apparatus of claim 27, wherein the searching within the stored information, reading of the stored information, and rereading of data from the corresponding position occurs in response to the data storage system being in a predetermined state after the storing of the information.

29. The apparatus of claim 27, wherein the controller deletes the at least one found identifier in the stored information regarding the corresponding successful retry parameters that are applied during the rewriting of the reread data at the corresponding position, in response to completion of the rewriting of the reread data.

30. A method of performing a retry in a data storage system, the method comprising:

searching within stored information for identifiers indicating at least one successful read retry of data of a storage medium, the read retry of the data being performed after a read attempt of the data was unsuccessful;

reading the stored information based upon at least one found identifier identifying corresponding successful retry parameters and position;

rereading data from the corresponding position on the storage medium by using the corresponding successful retry parameters read from the stored information; and rewriting the reread data at the corresponding position if it is determined that the rereading of data from the corresponding position was successful, with the corresponding successful retry parameters comprising at least values of parameters related to track alignment of a corresponding reading head with regard to recording tracks on the storage medium.

31. The method of claim 30, further comprising:

deleting the at least one found identifier in the stored information regarding the corresponding successful retry parameters that are applied during the rewriting of the reread data at the corresponding position, in response to completion of the rewriting of the reread data.

32. A computer-readable storage medium comprising computer readable code to control an apparatus to perform a retry in a data storage system, the retry comprising:

storing information including an indicator of a successful read retry with successful retry parameters corresponding to a position on a storage medium upon a corresponding successful reading of data from the position using the successful retry parameters;

searching within the stored information for identifiers indicating at least one successful read retry of data of the storage medium;

reading the stored information based upon at least one found identifier identifying corresponding successful retry parameters and position;

rereading data from the corresponding position by using the corresponding successful retry parameters read from the stored information; and rewriting the reread data at the corresponding position if it is determined that the rereading of data from the corresponding position was successful, with the corresponding successful retry parameters comprising at least values of parameters related to track alignment of a corresponding reading head with regard to recording tracks on the storage medium.

33. The computer-readable storage medium of claim 32, wherein the method further comprises:

deleting the at least one found identifier in the stored information regarding the corresponding successful retry parameters that are applied during the rewriting of the reread data at the corresponding position, in response to completion of the rewriting of the reread data.

* * * * *